UNITED STATES PATENT OFFICE.

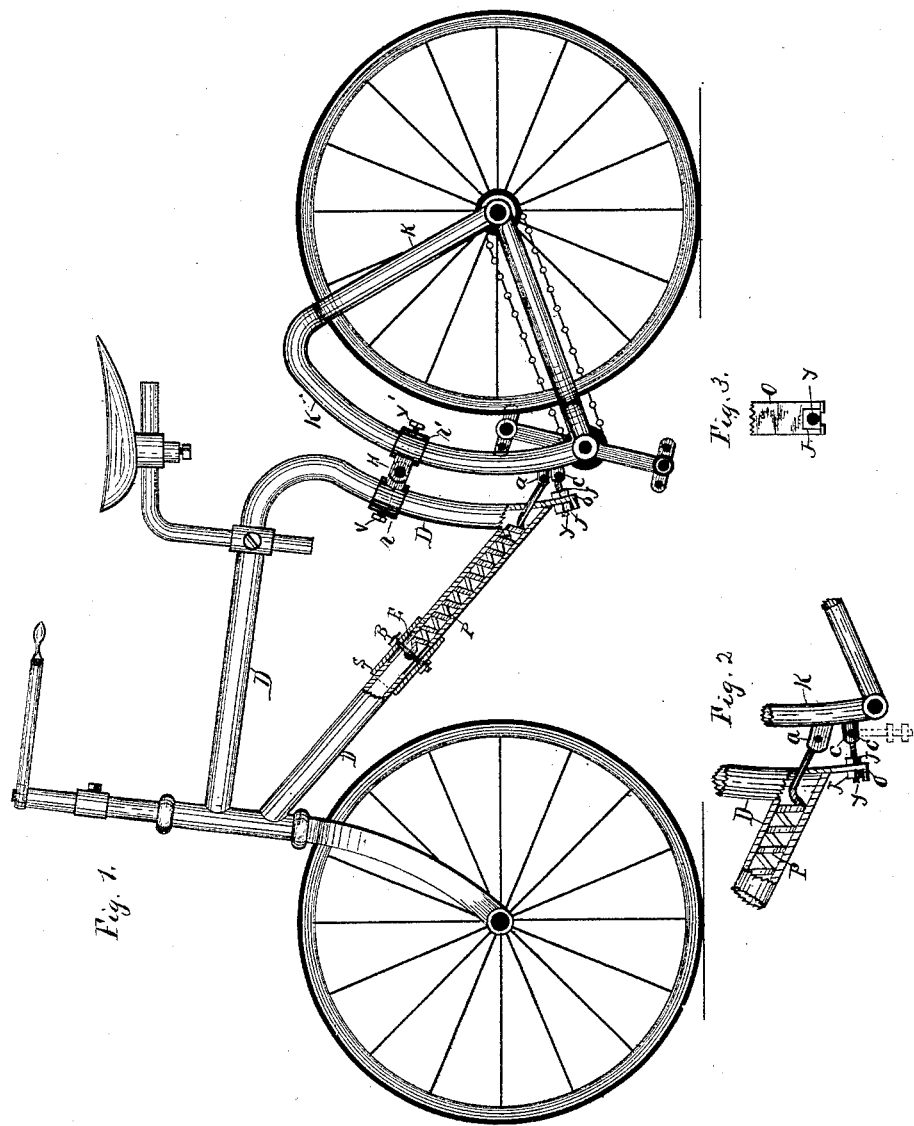

RAYMOND G. SURBRIDGE, OF JOLIET, ILLINOIS.

BICYCLE.

SPECIFICATION forming part of Letters Patent No. 450,705, dated April 21, 1891.

Application filed October 13, 1890. Serial No. 368,032. (No model.)

*To all whom it may concern:*

Be it known that I, RAYMOND G. SURBRIDGE, a citizen of the United States of America, residing at Joliet, in the county of Will and State of Illinois, have invented certain new and useful Improvements in Bicycles, of which the following is a specification, reference being had therein to the accompanying drawings, and the letters of reference thereon, forming a part of this specification, in which—

Figure 1 is a side elevation of the bicycle. Fig. 2 is a detail view showing the locking device for locking the two parts of the frame together, and Fig. 3 is a front view of the arms for connecting the lower part of the two frames.

This invention relates to certain improvements in bicycles, which improvements are fully set forth and explained in the following specification and claims.

Referring to the drawings, D represents the forward frame, and K the rear frame, the two frames being pivotally connected with each other by means of a hinge H. It is intended that the lower member of the frame D shall be tubular for containing a coil-spring P, having its rear end extending out through an aperture in said frame and attached to the forward part of the rear frame below the said hinge connection by means of hooking into the extending lug $a$, attached to said rear frame. The forward or opposite end of said spring is connected to a sliding bolt or cross-bar having a nut on one or both ends. Said bolt passes through a slot E in the lower member of frame D and also through a sleeve S, that slides on said frame. It is intended that when said sleeve is moved it will carry with it said bolt within the limits of said slot and hold it at any place it may be moved by means of tightening up the nuts on the ends of said bolt. The object of moving said bolt and its sleeve with the end of said spring P, to which said bolt attaches, is to regulate the tension of said spring for adjusting the machine to the weight of the rider, as when a light person is riding the machine less tension is required on said spring to hold the two parts of the machine-frame in proper position with each other than when a heavy person is riding the machine, it being necessary to regulate the resiliency of the spring to the weight of the rider. The hinge H is connected with the sliding boxes $r$ and $r'$, which are arranged to be adjusted along on their respective frames and held adjusted by means of set-screws $v$ $v$. This adjustable hinge is necessary for use in conjunction with the spring, for the reason that if said hinge were stationary at the point shown the weight of a very heavy rider would overcome the spring, or the tension of the spring might be too great for a very light rider, so that by adjusting the hinge nearer to or farther from the spring the machine can be made to conform to the weight of the rider without changing the spring for others of different tension. By thus yieldingly connecting the lower parts of the two frames D and K jolts and jars are overcome when passing over rough places.

The seat is shown as being placed on the forward frame; but it may as well be placed on the rear frame, if for any reason that is desirable.

The lower forward part of the rear frame K has pivotally connected therewith at $c$ an arm $y$, screw-threaded a good share of its length for carrying the two set-nuts J, and the rear lower part of the forward frame D is provided with the downwardly-extending forked arm $o$, having its lower end extending horizontally forward to form a support to one of the nuts J and said arm $y$, so that said arm will not fall in case the nuts J should become loose. When it is desired to dispense with the use of the coil-spring P by means of securing the two frames D and K rigidly together, the arm $y$ is turned up to enter the forked end of arm $o$, and the nuts J are then turned up, one on either side of arm $o$, which firmly secures said two frames together at that place. This is desirable when the machine is used on a smooth road, and not necessary to use the spring for preventing jars and jolts. When it desired to bring the spring into use when traveling over rough roads, the nuts J may be loosened and arm $y$ let down and be disconnected from arm $o$, as shown in the broken lines. As arm $y$ is screw-threaded near its entire length, means is furnished for adjusting the distance apart the two frames are to be secured, which is necessary to accommodate the height of the machine to the size of the rider. It will thus be seen that for use on a rough road the spring P is brought into use by means of disconnecting the arms y and o from each other, as shown in the broken lines; also, that a variable tension can be given to said spring in order to adjust the spring to correspond with the weight of the rider; also, that when the road is smooth and it is not necessary to bring the spring into use the two frames may be rigidly connected and adjusted the proper distance apart, thus adapting the machine for use on any kind of a road and to the weight and size of the rider.

Having thus described my invention, what I claim as new, and desire to secure by Letters Patent, is as follows, to wit:

1. In the bicycle shown and described, the combination of the frames D and K, pivotally connected with each other, spring P for yieldingly connecting said frames below the point of pivot, sliding bolt B, passing through slot E of frame D, and sleeve S for carrying said bolt, substantially as and for the purpose set forth.

2. The combination of frames D and K, pivotally connected with each other, spring P, bolt B, adapted to traverse slot E in frame D, and sleeve S for carrying said bolt, and the means for securing said sleeve and bolt in any desired place, substantially as and for the purpose set forth.

3. In the bicycle shown and described, the combination of the frames D and K, pivotally connected with each other, spring P, for yieldingly connecting said frames below the point of pivot, sliding bolt B, passing through slot E of frame D, sleeve S for carrying said bolt, arm y, pivotally connected with frame K and having the set-nuts J, and forked arm o, rigidly connected to frame D, all arranged to operate substantially as and for the purpose set forth.

RAYMOND G. SURBRIDGE.

Witnesses:
 THOS. H. HUTCHINS,
 K. C. HUTCHINS.